United States Patent
Mitsugi

(10) Patent No.: US 9,586,544 B2
(45) Date of Patent: Mar. 7, 2017

(54) POWER SOURCE SYSTEM DEVICE

(75) Inventor: Tatsuya Mitsugi, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 473 days.

(21) Appl. No.: 14/362,418

(22) PCT Filed: Jan. 6, 2012

(86) PCT No.: PCT/JP2012/000059
§ 371 (c)(1),
(2), (4) Date: Jun. 3, 2014

(87) PCT Pub. No.: WO2013/102957
PCT Pub. Date: Jul. 11, 2013

(65) Prior Publication Data
US 2015/0048674 A1   Feb. 19, 2015

(51) Int. Cl.
*B60R 16/033* (2006.01)
*B60R 16/03* (2006.01)

(52) U.S. Cl.
CPC ............ *B60R 16/033* (2013.01); *B60R 16/03* (2013.01)

(58) Field of Classification Search
CPC ......... B60R 16/03; B60R 16/033; G06F 1/26; G06F 1/305
USPC .................................................. 307/9.1, 10.1
See application file for complete search history.

(56) References Cited

U.S. PATENT DOCUMENTS

| | | | | |
|---|---|---|---|---|
| 5,166,538 A | * | 11/1992 | Norton | H02J 7/1438 307/10.1 |
| 6,107,788 A | * | 8/2000 | Oya | B60L 1/00 307/10.1 |
| 7,701,079 B2 | * | 4/2010 | O'Gorman | B60R 16/023 307/10.1 |
| 7,835,831 B2 | * | 11/2010 | Chung | B60L 11/1881 180/65.21 |
| 2004/0249534 A1 | | 12/2004 | Yamada et al. | |
| 2005/0151509 A1 | * | 7/2005 | Cook | H02J 1/00 320/116 |

(Continued)

FOREIGN PATENT DOCUMENTS

JP   2010-035278 A   2/2010
JP   2010-048123 A   3/2010
(Continued)

*Primary Examiner* — Levi Gannon
(74) *Attorney, Agent, or Firm* — Birch, Stewart, Kolasch & Birch, LLP

(57) ABSTRACT

A power source system device includes a primary power source circuit block 2 that generates a voltage (Mini+B–DropV) which is further dropped from the lowest voltage of the onboard battery that supplies power to electric and electronic parts of a vehicle, the lowest voltage occurring at a start of the engine of the vehicle; a secondary power source circuit block 3 that generates a power source voltage Vcc by boosting the voltage (Mini+B–DropV) generated by the primary power source circuit block 2, supplies the power source voltage Vcc to an integrated circuit including a control block that executes a general-purpose OS, and starts the integrated circuit; and an ACC check control circuit 4 that controls the start and stop of the operation of the primary power source circuit block 2 and secondary power source circuit block 3.

4 Claims, 11 Drawing Sheets

(56) References Cited

U.S. PATENT DOCUMENTS

| | | | | |
|---|---|---|---|---|
| 2005/0264268 A1* | 12/2005 | Ueno | ............... | H02J 7/0065 323/211 |
| 2009/0146493 A1* | 6/2009 | Fujino | ............... | B60L 11/1887 307/9.1 |
| 2011/0126031 A1 | 5/2011 | Oku | | |
| 2012/0292984 A1* | 11/2012 | Iwagami | ............... | B60R 16/00 307/9.1 |
| 2014/0265560 A1* | 9/2014 | Leehey | ............... | B60L 1/003 307/10.1 |
| 2015/0183334 A1* | 7/2015 | Bang | ............... | B60L 11/1861 307/9.1 |

FOREIGN PATENT DOCUMENTS

| | | |
|---|---|---|
| WO | WO 03/086820 A1 | 10/2003 |
| WO | WO 2010/116523 A1 | 10/2010 |

\* cited by examiner

POWER SOURCE SYSTEM DEVICE

TECHNICAL FIELD

The present invention relates to a power source system device to be mounted on a vehicle.

BACKGROUND ART

Patent Document 1, for example, discloses a power source management system for an onboard device. When a user of an onboard device requires and a power source has power supply capacity, it enables remote control of the onboard device by supplying power to a communication device to enable communication. In contrast, unless the power source has power supply capacity although the user of the onboard device requires, it breaks the power supply to the communication device to reduce discharge of a vehicular battery as the power source.

In addition, an onboard multimedia device described in Patent Document 2 comprises at least one functional module that operates by the power supply from a power source, and an interface to which expansion equipment is connected. When new expansion equipment is connected to the interface and when the existing functional module that is present from before the connection includes an existing functional module corresponding to the functional module of the expansion equipment, it breaks the power supply to the existing functional module, and supplies power to the functional module of the expansion equipment.

PRIOR ART DOCUMENTS

Patent Documents

Patent Document 1: PCT International Publication No. WO2003/086820.
Patent Document 2: PCT International Publication No. WO2010/116523.

DISCLOSURE OF THE INVENTION

Problems to be Solved by the Invention

For example, a personal computer (abbreviated to PC from now on) is supplied with stable power from a commercial power source or from a dedicated battery, and a smartphone (or a tablet PC) is also supplied with stable power from a dedicated battery.

In addition, the PC or smartphone includes an uninterruptible power supply or a circuit having an equivalent function so as to be supplied with power without interruption even if the power supply from the commercial power source or battery gets unstable.

Incidentally, the battery of the PC or smartphone is designed according to the specification of the current capacity of the device, and is made in such a manner as to prevent the working voltage from reducing even when the maximum current is used. Thus, as for the OS the PC uses (PC base OS) or the OS the smartphone uses (smartphone base OS), stable operation is guaranteed as to the power supply.

On the other hand, in the case of a vehicle, it can occur at an engine start at which the engine is not yet operated that the power source voltage drops temporarily because the onboard battery supplies power to various electric and electronic parts in the vehicle to start them. The voltage drop occurs markedly in an onboard battery deteriorated from aging. Thus, in a power source environment of a vehicle, the stable operation of the OS is not guaranteed as to the power supply, and the PC base or smartphone base OS (referred to as "general-purpose OS" where appropriate) cannot be used as they are.

In contrast with this, if a dedicated battery to an ECU (electronic control unit) of a vehicle is mounted in addition to the battery that supplies power to the electric and electronic parts of the vehicle, a general-purpose OS may be used. However, this will increase the number of parts and complicate the manufacturing process, and is disadvantageous in terms of the cost and offers a problem about safety.

Incidentally, although the conventional techniques typified by the Patent Documents 1 and 2 can use the onboard battery efficiently, they do not consider the power source environment of the vehicle described above. Accordingly, applying the invention of the Patent Document 1 or 2 does not make it possible to employ a general-purpose OS as it is.

The present invention is implemented to solve the foregoing problems. Therefore it is an object of the present invention to provide a power source system device capable of using a general-purpose OS in the power source environment of the onboard battery of a vehicle.

Means for Solving the Problem

A power source system device in accordance with the present invention comprises: a primary power source circuit block that generates a voltage further dropped from a lowest voltage of an onboard battery that supplies power to electric and electronic parts of a vehicle, the lowest voltage occurring at a start of the engine of the vehicle; a secondary power source circuit block that generates a power source voltage by boosting the voltage generated by the primary power source circuit block, supplies the power source voltage to an integrated circuit including a control block that executes a general-purpose operation system, and starts the integrated circuit; and a control circuit that controls a start and stop of an operation of the primary power source circuit block and the secondary power source circuit block.

Advantages of the Invention

According to the present invention, it has an advantage of being able to use a general-purpose OS in the power source environment of the onboard battery of the vehicle.

BEST MODE FOR CARRYING OUT THE INVENTION

The best mode for carrying out the invention will now be described with reference to the accompanying drawings to explain the present invention in more detail.

Embodiment 1

Figure 1:
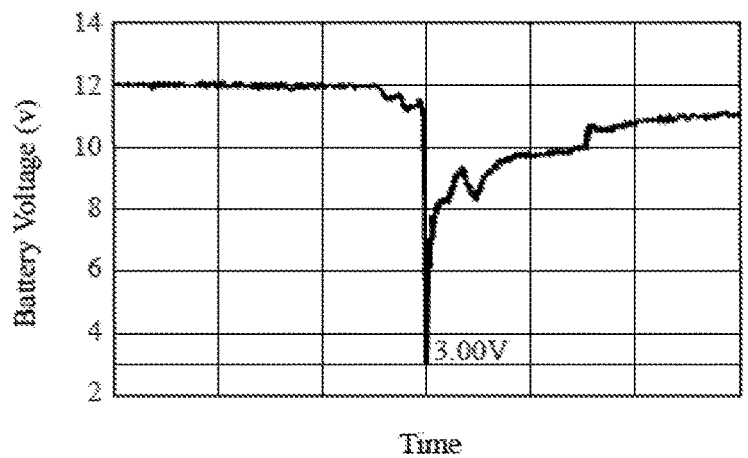
FIG. 1 is a graph showing a voltage waveform of an onboard battery at a start of the engine of a vehicle.

FIG. 1 is a graph showing a voltage waveform of an onboard battery at the start of the engine of a vehicle. It is known that the onboard battery has an irregular battery voltage waveform with a voltage drop as shown in FIG. 1 because it supplies power to various electric and electronic parts in the vehicle at a start of the engine of the vehicle. To reduce the irregularity of the battery voltage waveform, it is conceived to introduce a filter circuit comprising a capacitor or a coil or a combination of them into a power supply path from the onboard battery.

However, to reduce sharp voltage fluctuations as shown in FIG. 1, it is unavoidable that a complicated circuit is required and hence the circuit scale increases. In addition, in the case of using a capacitor, unless electric charges are stored, the reducing effect in the fluctuations of the battery voltage cannot be expected. Furthermore, the effect expected can be reduced because of aging.

As shown in FIG. 1, although the onboard battery has a lowest voltage (+3 V in FIG. 1) at the start of the engine because of a lot of current consumed to start the electric and electronic parts (such as a starter) of the vehicle, once the electric and electronic parts have started and their operations become stable, the lowest voltage returns to the steady voltage (+12 V in FIG. 1).

In addition, as for the ECU of a vehicle, the operable voltage necessary for the operation is defined. If the onboard battery is normal, the operable voltage of the ECU is lower than the lowest voltage at the start of the engine. In other words, the operable voltage of the ECU is maintained even if the onboard battery drops to the lowest voltage.

As the power source voltage Vcc of a control block consisting of an IC (Integrated Circuit) including a CPU that executes a general-purpose OS of a PC or smartphone (or tablet PC), 3.3 V and 5.0 V are widely used. Recently, however, integrated circuits that start at the low voltage of 3.3 V have been spread because of a demand for low power consumption and low noise.

Thus, in the power source environment of a vehicle, stable supply of the power source voltage Vcc to the control block will be able to ensure a stable operation of the general-purpose OS with respect to the power supply.

Incidentally, the term "general-purpose OS" in the present invention refers to an OS such as Windows (registered trademark), Linux (registered trademark) and Android (registered trademark) widely used in a PC, smartphone and tablet PC rather than an embedded OS or a dedicated OS for vehicles, which have their processing contents adjusted in accordance with the power source environment of the vehicle.

A power source system device in accordance with the present invention supplies the stable power source voltage Vcc to the control block by utilizing the lowest voltage of the onboard battery and the return time from the lowest voltage to the steady voltage in the power source environment characteristic to a vehicle. This enables the operation using a general-purpose OS in the power source environment of a vehicle.

Figure 2:
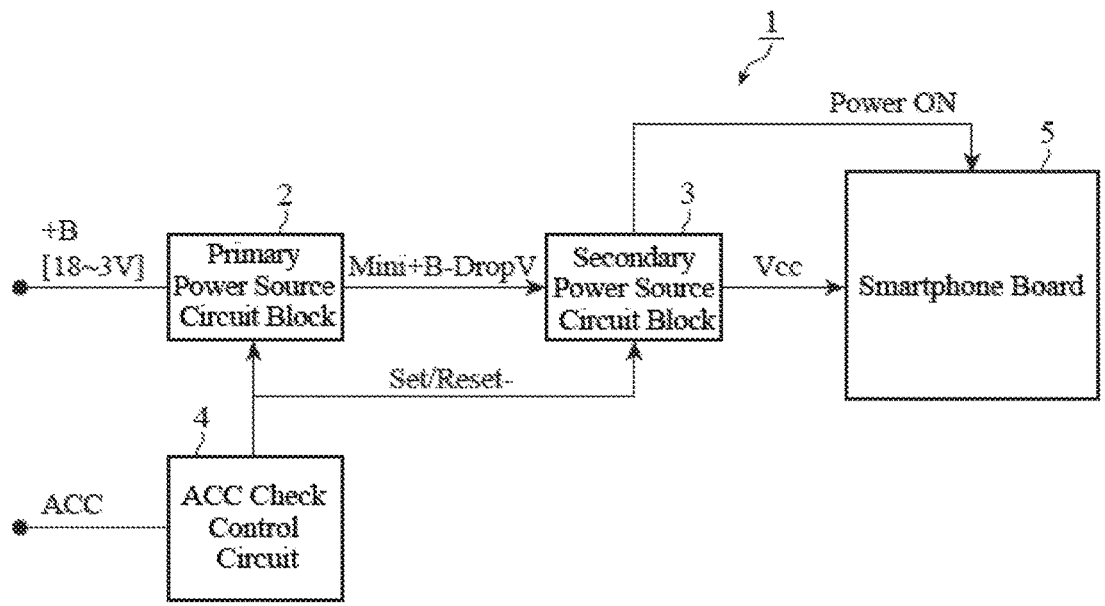
FIG. 2 is a block diagram showing a configuration of a power source system device of an embodiment 1 in accordance with the present invention.

FIG. 2 is a block diagram showing a configuration of a power source system device of an embodiment 1 in accordance with the present invention, which shows a case of supplying the power source voltage Vcc to a control block consisting of the integrated circuit incorporated into a smartphone. The power source system device 1 shown in FIG. 2, which is a device that supplies the power source voltage Vcc from the battery voltage of an onboard battery (not shown in FIG. 2) to the control block that uses the general-purpose OS, comprises a primary power source circuit block 2, a secondary power source circuit block 3 and an ACC check control circuit 4.

The primary power source circuit block 2 is a voltage drop power source circuit block that is connected to an onboard battery (+B), and that outputs a voltage (Mini+B−DropV) generated by further dropping the maximally dropped battery voltage (Mini+B) at the start of the engine of the vehicle by a prescribed voltage (DropV). In the example shown in FIG. 1, the feeder terminal +B of the onboard battery varies from the maximally dropped battery voltage (Mini+B) of +3.0 V up to +12 V. Incidentally, the vehicle rated specification defines the maximum voltage at the feeder terminal +B of the onboard battery at +18 V. Accordingly, in the following description, the maximum voltage at the feeder terminal +B is assumed to be +18 V.

The battery voltage waveform fluctuations at the start of the engine are rather reproducible as long as the onboard battery is normal (in the example of FIG. 1, they are +3 V−+12 V). In the present invention, the lowest voltage (Mini+B) with comparatively little fluctuations is used as the reference voltage for generating the power source voltage Vcc.

Incidentally, the primary power source circuit block 2 generates the voltage (Mini+B−DropV) in such a manner as to make Vcc>(Mini+B−DropV), where Vcc is the power source voltage of the control block mounted on the smartphone board 5. Thus, the primary power source circuit block 2 generates the constant voltage (Mini+B−DropV) by dropping the comparatively stable lowest voltage (Mini+B). For example, it drops the lowest voltage (Mini+B)=+3.0 V by 0.2 V to generate +2.8 V, which is the cell voltage of a lithium-ion.

The secondary power source circuit block 3 is a boosting power source circuit block that generates the power source voltage Vcc by boosting the voltage (Mini+B−DropV) the primary power source circuit block 2 generates, and starts the control block composed of the foregoing integrated circuit mounted on the smartphone board 5 after supplying the power source voltage Vcc.

For example, it boosts the voltage +2.8 V generated by the primary power source circuit block 2 to generate 3.3 V and 5.0 V, which are the common power source voltage of an IC including a CPU that executes a general-purpose OS, and supplies them to the integrated circuit in the control block with the power source voltage of 3.3 V and 5.0 V.

The ACC check control circuit 4 is a control circuit that supplies, when the accessory (ACC) signal for starting the electric and electronic parts of the vehicle is turned on, the primary power source circuit block 2 and secondary power source circuit block 3 with a Set signal instructing the start of the power supply operation for only a prescribed period and then with a Reset signal.

The smartphone board 5, which is the basic board of the smartphone, has the control block that is mounted thereon and comprises the IC (integrated circuit) including the CPU that performs processing by executing the smartphone base OS.

Next, the operation will be described.

Figure 3:
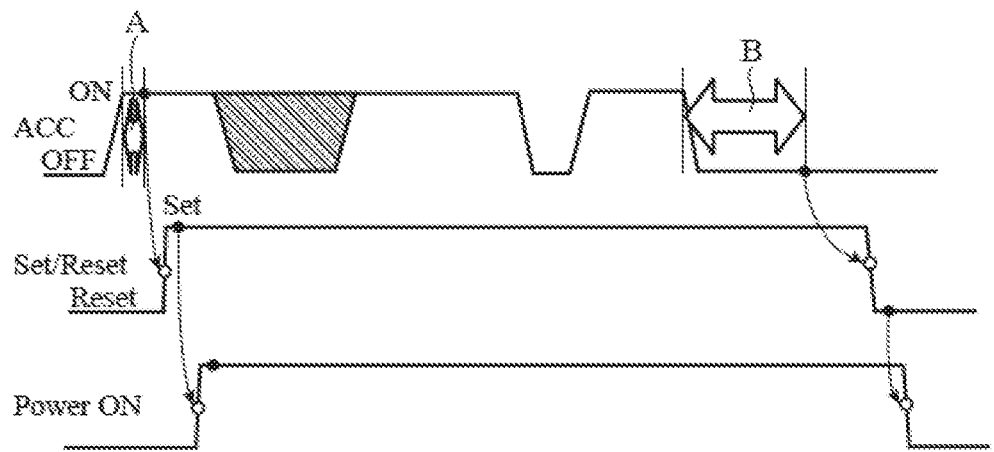
FIG. 3 is a timing chart of an ACC signal, a Set/Reset signal and a start signal PowerON used in the power source system device of the embodiment 1.

FIG. 3 is a timing chart of the ACC signal, Set/Reset signal and start signal PowerON, which are used by the power source system device of the embodiment 1. When the ignition (IG) key of the vehicle is turned on and the engine is started, the ACC signal changes from the OFF state to the ON state as shown in FIG. 3.

The ACC check control circuit 4 monitors the state of the ACC signal periodically, and counts a prescribed time period (duration indicated by the double-pointed arrow A of FIG. 3) from the point of time the ACC signal becomes ON state by using a timer not shown. The prescribed time period A is a time period for determining the ON state of the ACC signal, and is set at 200 milliseconds, for example.

When the ON state of the ACC signal continues for the prescribed time period A, the ACC check control circuit 4 sets the Set/Reset signal as shown in FIG. 3 and instructs the primary power source circuit block 2 and secondary power source circuit block 3 to start the operation.

Receiving the Set signal from the ACC check control circuit 4, the primary power source circuit block 2 generates the voltage (Mini+B−DropV) by reducing the maximally dropped battery voltage (Mini+B) occurring in the onboard battery at the start of the engine by the prescribed voltage DropV, and supplies it to the secondary power source circuit block 3.

Receiving the Set signal from the ACC check control circuit 4 and the voltage (Mini+B−DropV) from the primary power source circuit block 2, the secondary power source circuit block 3 generates the power source voltage Vcc by boosting the voltage (Mini+B−DropV).

Next, the secondary power source circuit block 3 supplies the power source voltage Vcc it generates to the control block of the smartphone board 5, followed by supplying the start signal PowerON to the control block to start the control block as shown in FIG. 3.

After that, the ACC check control circuit 4 counts a prescribed time period (time period indicated by the double-pointed arrow B of FIG. 3) after the point of time the ACC signal becomes OFF state. Incidentally, the prescribed time period B is a time period for determining that the ACC is in the OFF state, and is set at 30 seconds, for example.

When the ACC signal continues the OFF state for the prescribed time period B, the ACC check control circuit 4 resets the Set/Reset signal as shown in FIG. 3, and instructs the primary power source circuit block 2 and secondary power source circuit block 3 to terminate the operation.

Receiving the Reset signal from the ACC check control circuit 4, the primary power source circuit block 2 stops supplying the voltage (Mini+B−DropV) to the secondary power source circuit block 3.

In addition, receiving the Reset signal from the ACC check control circuit 4, the secondary power source circuit block 3 also stops supplying the power source voltage Vcc to the control block of the smartphone board 5.

This causes the control block of the smartphone board 5 to stop its operation.

Incidentally, a configuration is also conceivable which causes the primary power source circuit block 2 to stop the power supply after a prescribed shutdown time period of the general-purpose OS has elapsed.

Figure 4:
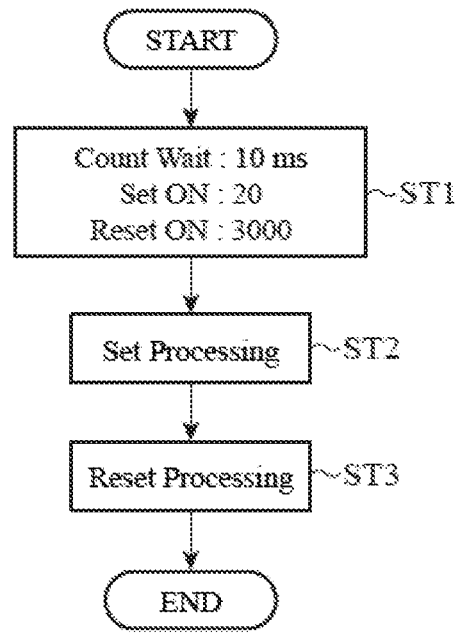
FIG. 4 is a flowchart showing the operation of the ACC check control circuit of FIG. 2.

FIG. 4, which is a flowchart showing the operation of the ACC check control circuit of FIG. 2, shows a flow of the operation conforming the timing chart of FIG. 3.

First, when the ACC check control circuit 4 starts, it initializes the count value of the timer that counts at every monitoring time interval (CountWait) which is the period of monitoring the state of the ACC signal, and sets as the set values the count number for defining the prescribed time period A that determines the ON state of the ACC signal and the count number for defining the prescribed time period B that determines the OFF state of the ACC signal (step ST1).

For example, the monitoring time interval (CountWait) is set at 10 millisecond, the count number for defining the prescribed time period A for maintaining the Set signal at ON is set at 20, and the count number for defining the prescribed time period B for maintaining the Reset signal at ON is set at 3000.

Thus, the ACC check control circuit 4 monitors the ACC state at every 10 milliseconds by the timer, and determines the ON state of the ACC when the ON state of the ACC signal continues 20 counts (20*10 millisecond=200 milliseconds). In addition, it determines the OFF state of the ACC signal when the OFF state of the ACC signal continues 3000 counts (3000*10 milliseconds=30 seconds).

The time period up to the fixing of the OFF state of the ACC signal is set longer than the saving time of the user memory for storing data resulting from using an application on the general-purpose OS by a user, and longer than the saving time of the system memory the general-purpose OS uses in accordance with the state of the system.

The ACC check control circuit 4 executes the Set processing when the ON state of the ACC signal continues 20 counts (20*10 millisecond=200 milliseconds) (step ST2).

In addition, the ACC check control circuit 4 executes the Reset processing when the OFF state of the ACC signal continues 3000 counts (3000*10 milliseconds=30 seconds), and terminates the operation (step ST3).

Figure 5:
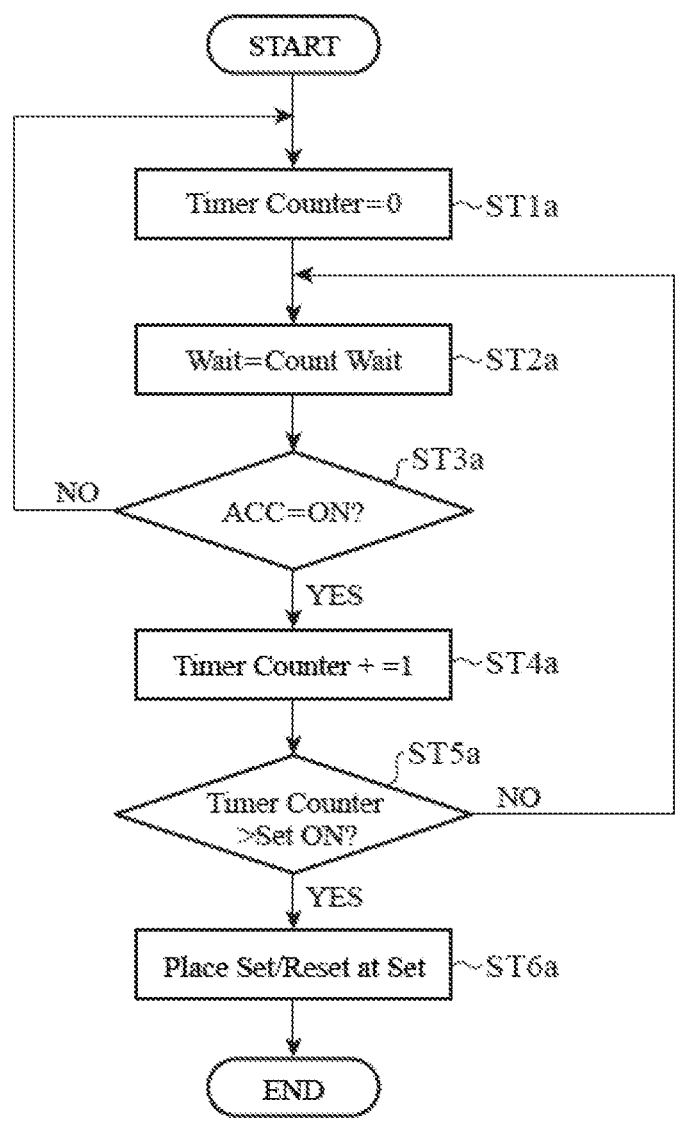
FIG. 5 is a flowchart showing details of the Set processing of the embodiment 1.

FIG. 5 is a flowchart showing the details of the Set processing of the embodiment 1, which shows the processing of step ST2 of FIG. 4.

First, when the ACC check control circuit 4 starts the Set processing, it initializes the count value of the timer (TimerCounter) to "0" (step ST1*a*).

Next, the ACC check control circuit 4 proceeds to awaiting mode until the timer counts the monitoring time interval (CountWait=10 milliseconds) (step ST2*a*).

When the timer counts the monitoring time interval (CountWait=10 milliseconds), the ACC check control circuit 4 decides on whether the ACC signal is in the ON state or not (step ST3a). Unless the ACC signal is in the ON state (NO at step ST3a), it returns to the processing at step ST1a.

On the other hand, if the ACC signal is in the ON state (YES at step ST3a), the ACC check control circuit 4 increments the count value of the timer (TimerCounter) by one (step ST4a).

Next, the ACC check control circuit 4 decides on whether the count value of the timer (TimerCounter) exceeds the count number (20 counts: Set ON) set at step ST1 of FIG. 4 or not (TimerCounter>Set ON) (step ST5a).

If the count value of the timer (TimerCounter) is not greater than the prescribed count number (Set ON) (NO at step ST5a), the ACC check control circuit 4 returns to the waiting mode at step ST2a and repeats the foregoing processing.

On the other hand, if the count value of the timer (TimerCounter) exceeds the prescribed count number (Set ON) (YES at step ST5a), the ACC check control circuit 4 sets the Set/Reset signal at Set, and instructs the primary power source circuit block 2 and secondary power source circuit block 3 to start the operation (step ST6a).

Figure 6:
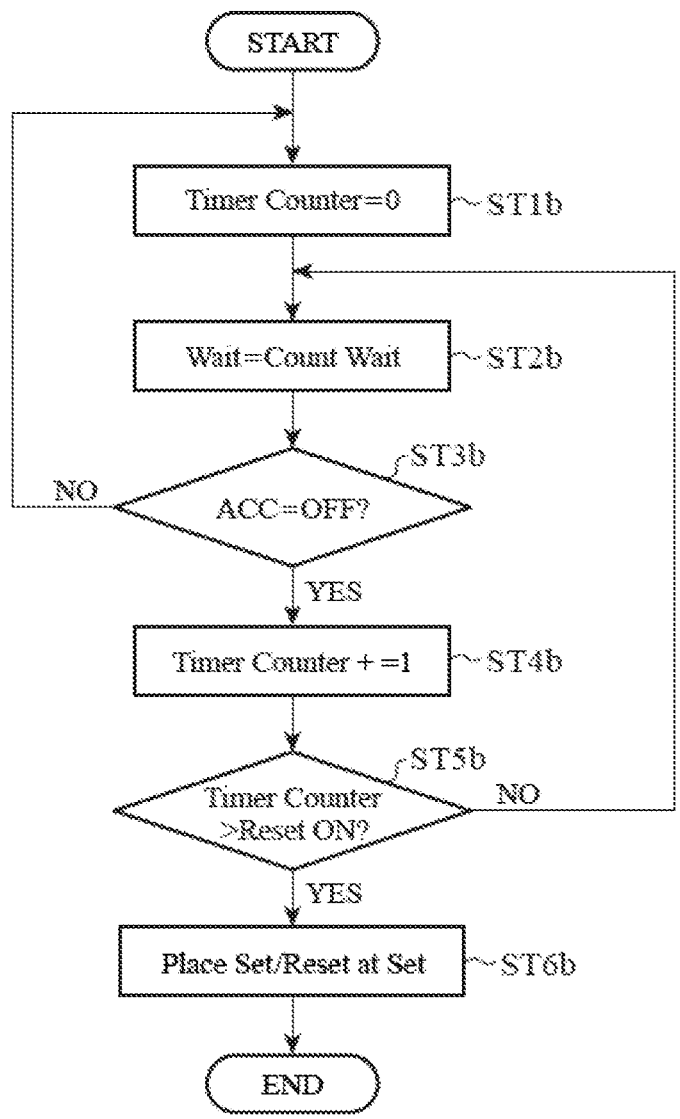
FIG. 6 is a flowchart showing details of the Reset processing of the embodiment 1.

FIG. 6, which is a flowchart showing the details of the Reset processing of embodiment 1, shows the processing of step ST3 of FIG. 4.

First, after the ACC check control circuit 4 executes the Set processing, it initializes the count value of the timer (TimerCounter) to "0" (step ST1b).

Next, the ACC check control circuit 4 stays at the waiting mode until the timer counts the monitoring time interval (CountWait=10 milliseconds) (step ST2b).

If the timer counts the monitoring time interval (CountWait=10 milliseconds), the ACC check control circuit 4 decides on whether the ACC signal is in the OFF state or not (step ST3b). Unless the ACC signal is in the OFF state (NO at step ST3b), it returns to the processing at step ST1b.

On the other hand, if the ACC signal is in the OFF state (YES at step ST3b), the ACC check control circuit 4 increments the count value of the timer (TimerCounter) by one (step ST4b).

Next, the ACC check control circuit 4 decides on whether the count value of the timer (TimerCounter) exceeds the prescribed count number (3000 counts: Reset ON) set at step ST1 of FIG. 4 (TimerCounter>Reset ON) or not (step ST5b).

If the count value of the timer (TimerCounter) is not greater than the prescribed count number (Reset ON) (NO at step ST5b), the ACC check control circuit 4 returns to step ST2b to enter the waiting mode, and repeats the foregoing processing.

On the other hand, if the count value of the timer (TimerCounter) exceeds the prescribed count number (Reset ON) (YES at step ST5b), the ACC check control circuit 4 places the Set/Reset signal at Reset, and instructs the primary power source circuit block 2 and secondary power source circuit block 3 to terminate their operation (step ST6b).

As described above, according to the present embodiment 1, it comprises the primary power source circuit block 2 that generates the voltage (Mini+B−DropV) by dropping the lowest voltage of the onboard battery which feeds the power to the electric and electronic parts of the vehicle at the start of the engine of the vehicle; the secondary power source circuit block 3 that generates the power source voltage Vcc by boosting the voltage (Mini+B−DropV) generated by the primary power source circuit block 2, and supplies the power source voltage Vcc to the integrated circuit including the control block executing the general-purpose OS to start the integrated circuit; and the ACC check control circuit 4 that controls the start and stop of the operation of the primary power source circuit block 2 and secondary power source circuit block 3.

With the foregoing configuration, even if the battery voltage waveform of the onboard battery fluctuates at the start of the engine, it can supply the control block that executes the general-purpose OS with the prescribed power source voltage Vcc generated by using the lowest voltage of the battery voltage as the reference and starts the control block, thereby being able to cause the OS not adjusted to the vehicle to carry out stable operation.

In addition, according to the present embodiment 1, the ACC check control circuit 4 controls the primary power source circuit block 2 and secondary power source circuit block 3 to start their operation when the ON state of the ACC signal of the vehicle continues for the prescribed time period A and to stop their operation when the OFF state of the ACC signal of the vehicle continues for the prescribed time period B. In this way, since it starts its operation when the ON state of the ACC signal continues for the prescribed time period, it can cause the control block to operate. In addition, since it decides the stop of its operation when the OFF state of the ACC signal continues for the prescribed time period, it can mitigate the unstable operation of the control block at the end of its operation.

Embodiment 2

Figure 7:
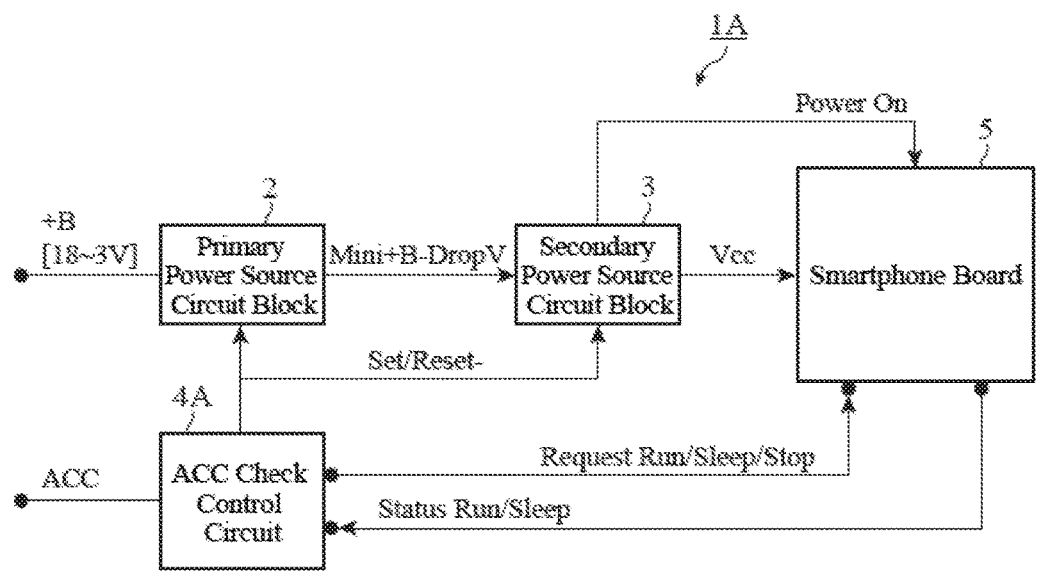
FIG. 7 is a block diagram showing a configuration of a power source system device of an embodiment 2 in accordance with the present invention.

FIG. 7 is a block diagram showing a configuration of a power source system device of an embodiment 2 in accordance with the present invention, which shows a case of supplying the power source voltage Vcc to the control block incorporated into a smartphone. The power source system device 1A as shown in FIG. 7, which is a device that supplies the power source voltage Vcc from the battery voltage of an onboard battery (not shown in FIG. 7) to the control block that uses a general-purpose OS, comprises the primary power source circuit block 2, the secondary power source circuit block 3 and an ACC check control circuit 4A. The ACC check control circuit 4A not only operates in the same manner as the ACC check control circuit 4 of FIG. 2, but also makes a request (Request) to the control block of the smartphone board 5 for a Run, Sleep or Stop mode as a prescribed operational mode (Status). The control block of the smartphone board 5 proceeds to the operational mode corresponding to the Request signal from the ACC check control circuit 4A. Incidentally, in FIG. 7, the same components as those of FIG. 2 are designated by the same reference symbols, and their description will be omitted.

Next, the operation will be described.

Figure 8:
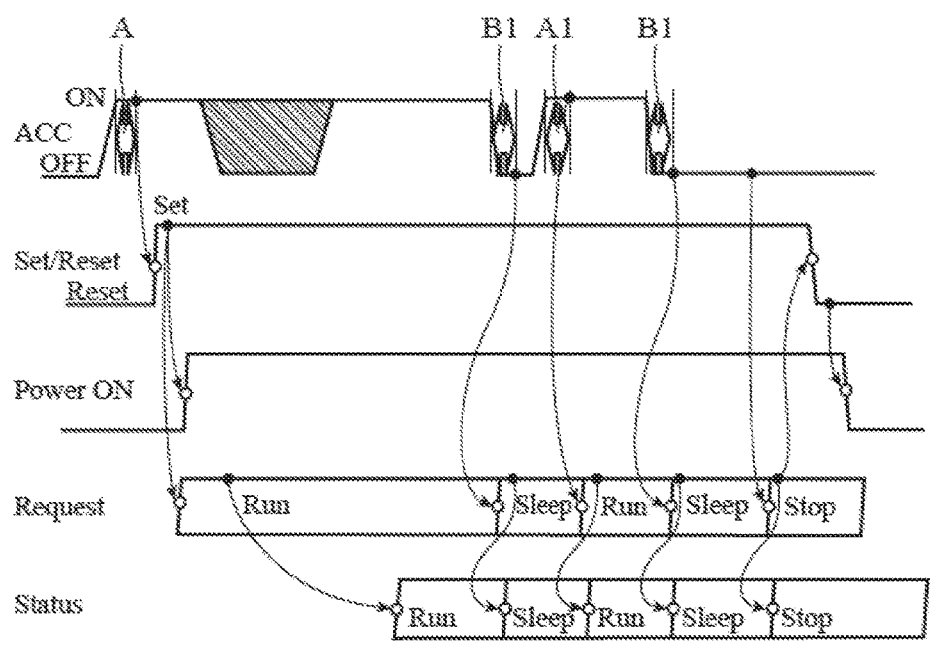
FIG. 8 is a timing chart of an ACC signal, a Set/Reset signal, a start signal PowerON, a Request signal and a Status signal used in the power source system device of the embodiment 2.

FIG. 8 is a timing chart of the ACC signal, Set/Reset signal, start signal PowerON, Request signal and Status signal used in the power source system device of the embodiment 2.

The ACC check control circuit 4A is periodically monitoring the value of the ACC signal, and counts the prescribed time period A from the point of time the ACC signal is turned on using a timer not shown.

When the ACC signal continues the ON state for the prescribed time period A, the ACC check control circuit 4A sets the Set/Reset signal at Set as shown in FIG. 8, and instructs the primary power source circuit block 2 and secondary power source circuit block 3 to start their operation.

The prescribed time period A is set in accordance with the specification as to the start time period in the system.

Receiving the Set signal from the ACC check control circuit 4A, the primary power source circuit block 2 generates the voltage (Mini+B−DropV) by reducing the maximally dropped battery voltage (Mini+B) occurring in the onboard battery at the start of the engine by the prescribed voltage DropV, and supplies it to the secondary power source circuit block 3.

Receiving the Set signal from the ACC check control circuit 4A and the voltage (Mini+B−DropV) from the primary power source circuit block 2, the secondary power source circuit block 3 generates the power source voltage Vcc by boosting the voltage (Mini+B−DropV).

Next, the secondary power source circuit block 3 supplies the power source voltage Vcc it generates to the control block of the smartphone board 5, followed by supplying the start signal PowerON to the control block to start the control block as shown in FIG. 8.

In addition, when the ACC check control circuit 4A sets the Set/Reset signal at Set, it sends a Request signal that makes a request to the control block of the smartphone board 5 for the Run mode as shown in FIG. 8. Here, the "Run mode" is a state in which the control block operates in response to the operation clock signal while consuming the power source voltage Vcc supplied from the secondary power source circuit block 3.

Receiving the Request signal from the ACC check control circuit 4A, the control block of the smartphone board 5 shifts to the operational mode requested by the Request signal, and sends a response about that to the ACC check control circuit 4A as the Status signal. Here, when the control block enters the Run mode, it sends the Status signal indicating that it enters the Run mode to the ACC check control circuit 4A.

After that, the ACC check control circuit 4A counts a prescribed time period (time period indicated by the double-pointed arrow B1 of FIG. 8) from the point of time the ACC signal becomes OFF state. Incidentally, the prescribed time period B1 is a time period indicating that the ACC signal is placed in the OFF state intermittently, and is set at 300 milliseconds, for example. Thus, it indicates that the control block of the smartphone board 5 operates in a power saving mode.

The prescribed time period B1 is set in accordance with the specification about the proceeding time period from the normal mode to the power saving mode in the system.

If the OFF state of the ACC signal continues for the prescribed time period B1, the ACC check control circuit 4A sends the Request signal for requesting the Sleep mode to the control block of the smartphone board 5 as shown in FIG. 8. The Sleep mode is a state in which the supply of the operation clock signal to the control block is stopped, and the consumption of the power source voltage Vcc fed from the secondary power source circuit block 3 is lower than the consumption in the Run mode.

Receiving the Request signal from the ACC check control circuit 4A, the control block of the smartphone board 5 proceeds to the operational mode requested thereby, and responds to the ACC check control circuit 4A by sending the Status signal indicating that. Thus, if the control block enters the Sleep mode, it sends the Status signal indicating that it becomes the Sleep mode to the ACC check control circuit 4A.

Next, if the ACC signal changes its state from the OFF state to the ON state, the ACC check control circuit 4A counts the prescribed time period (time period by the double-pointed arrow A1 in FIG. 8) from the point of time the ACC signal becomes ON state. Incidentally, the prescribed time period A1 is a time period in which the ACC signal returns from the OFF state to the ON state, and is set at 150 milliseconds, for example. In other words, it indicates that the control block of the smartphone board 5 should return to the Run mode from the Sleep mode.

The prescribed time period A1 is set in accordance with the specification about the proceeding time period from the power saving mode to the normal mode in the system.

If the ON state of the ACC signal continues for the prescribed time period A1, the ACC check control circuit 4A sends the Request signal for requesting the Run mode to the control block of the smartphone board 5 as shown in FIG. 8.

Receiving the Request signal from the ACC check control circuit 4A, the control block of the smartphone board 5 proceeds to the operational mode requested thereby, and responds to the ACC check control circuit 4A by sending the Status signal indicating that. Thus, if the control block changes from the Sleep mode to the Run mode because the operation clock signal is supplied, it sends the Status signal indicating that it enters the Run mode to the ACC check control circuit 4A.

Then, if the ACC signal changes from the ON state to the OFF state, the ACC check control circuit 4A counts the prescribed time period B1 from the point of time the ACC signal becomes OFF state.

When the OFF state of the ACC signal continues for the prescribed time period B1, the ACC check control circuit 4A sends the Request signal for requesting the Sleep mode to the control block of the smartphone board 5 as shown in FIG. 8.

Receiving the Request signal from the ACC check control circuit 4A, the control block of the smartphone board 5 proceeds to the operational mode requested thereby, and responds to the ACC check control circuit 4A by sending the Status signal indicating that. Thus, when the control block enters the Sleep mode, it sends the Status signal indicating that it enters the Sleep mode to the ACC check control circuit 4A.

As in the foregoing embodiment 1, if the ACC signal continues the OFF state without being turned on, the ACC check control circuit 4A counts the prescribed time period B from the point of time the ACC signal becomes OFF state. If the OFF state of the ACC signal continues for the prescribed time period B, the ACC check control circuit 4A sends the Request signal for requesting the Stop mode to the control block of the smartphone board 5 as shown in FIG. 8. The Stop mode is a state in which the operation clock signal is stopped, the supply of the power source voltage Vcc from the secondary power source circuit block 3 is also stopped, and the control block stops its operation.

Receiving the Request signal from the ACC check control circuit 4A, the control block of the smartphone board 5 enters the Stop mode requested by the Request signal.

The prescribed time period B is set at a time period longer than the saving time of the user memory in which a user stores data using an application on the general-purpose OS, and longer than the saving time of the system memory which the general-purpose OS uses in accordance with the state of the system.

Figure 9:
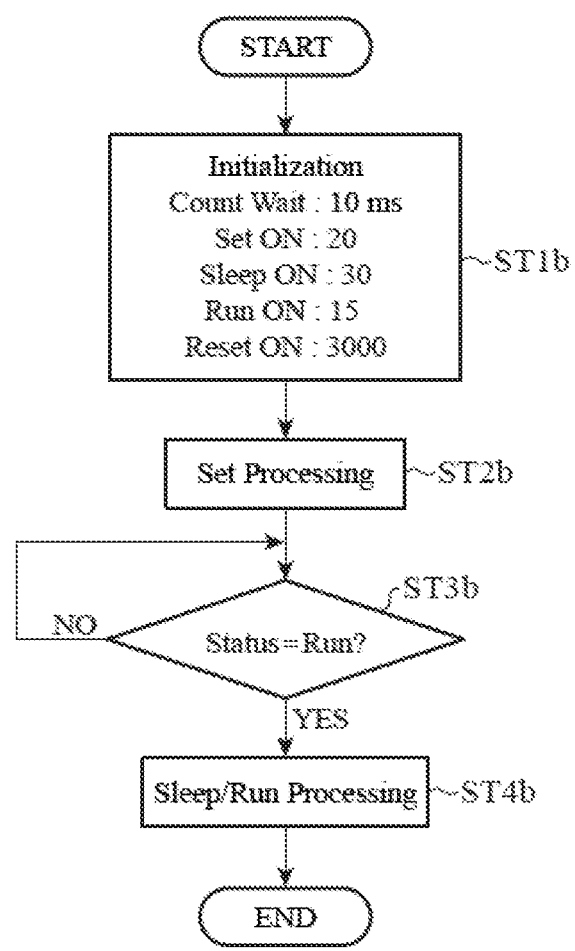
FIG. 9 is a flowchart showing the operation of the ACC check control circuit of FIG. 7.

FIG. 9 is a flowchart showing the operation of the ACC check control circuit of FIG. 7, which shows a flow of the operation in conformity with the timing chart of FIG. 8.

First, at its start, the ACC check control circuit 4A initializes the count value of the timer that counts at every monitoring time interval (CountWait) for monitoring the state of the ACC signal, and sets the count number for defining the prescribed time period A for determining the ON state of the ACC signal, the count number for defining the prescribed time period B1 for requesting the Sleep mode, the count number for defining the prescribed time period A1 requesting the return from the Sleep mode to the Run mode, and the prescribed time period for requesting the Stop mode, that is, the count number for defining the prescribed time period B for determining the OFF state of the ACC signal as the set value (step ST1b).

For example, it sets the monitoring time interval (CountWait) at 10 milliseconds, the count number for defining the prescribed time period A for turning on the Set signal at 20 counts, the count number for defining the prescribed time period B1 for requesting the Sleep mode at 30 counts, the count number for defining the prescribed time period A1 for requesting the return from the Sleep mode to the Run mode at 15 counts, and the count number for defining the prescribed time period B for requesting the Stop mode at 3000 counts.

Thus, the ACC check control circuit 4A monitors the state of the ACC signal at every interval of 10 milliseconds with the timer, and if the ON state of the ACC signal continues 20 counts (20*10 milliseconds=200 milliseconds), it determines the ON state of the ACC.

In addition, if the OFF state of the ACC signal continues 30 counts (30*10 milliseconds=300 milliseconds), it requests the Sleep mode. If the ON state of the ACC signal continues 15 counts (15*10 milliseconds=150 milliseconds), it requests the Runmode. Furthermore, if the OFF state of the ACC signal continues 3000 counts (3000*10 milliseconds=30 seconds), it requests the Stop mode.

The ACC check control circuit 4A executes the Set processing if the ON state of the ACC signal continues for 20 counts (20*10 milliseconds=200 milliseconds) (step ST2b).

Incidentally, since the Set processing has the same processing contents as those described with reference to FIG. 5 in the foregoing embodiment 1, its description will be omitted.

Next, the ACC check control circuit 4A decides on whether the control block is in the Run mode or not from the Status signal received from the control block of the smartphone board 5 (step ST3b). Unless the control block is in the Run mode (NO at step ST3b), the ACC check control circuit 4A repeats the decision until the control block enters the Run mode.

If the control block is in the Run mode (YES at step ST3b), the ACC check control circuit 4A executes the Sleep/Run processing in accordance with the ON or OFF state of the ACC signal and terminates the processing (step ST4b).

Figure 10:
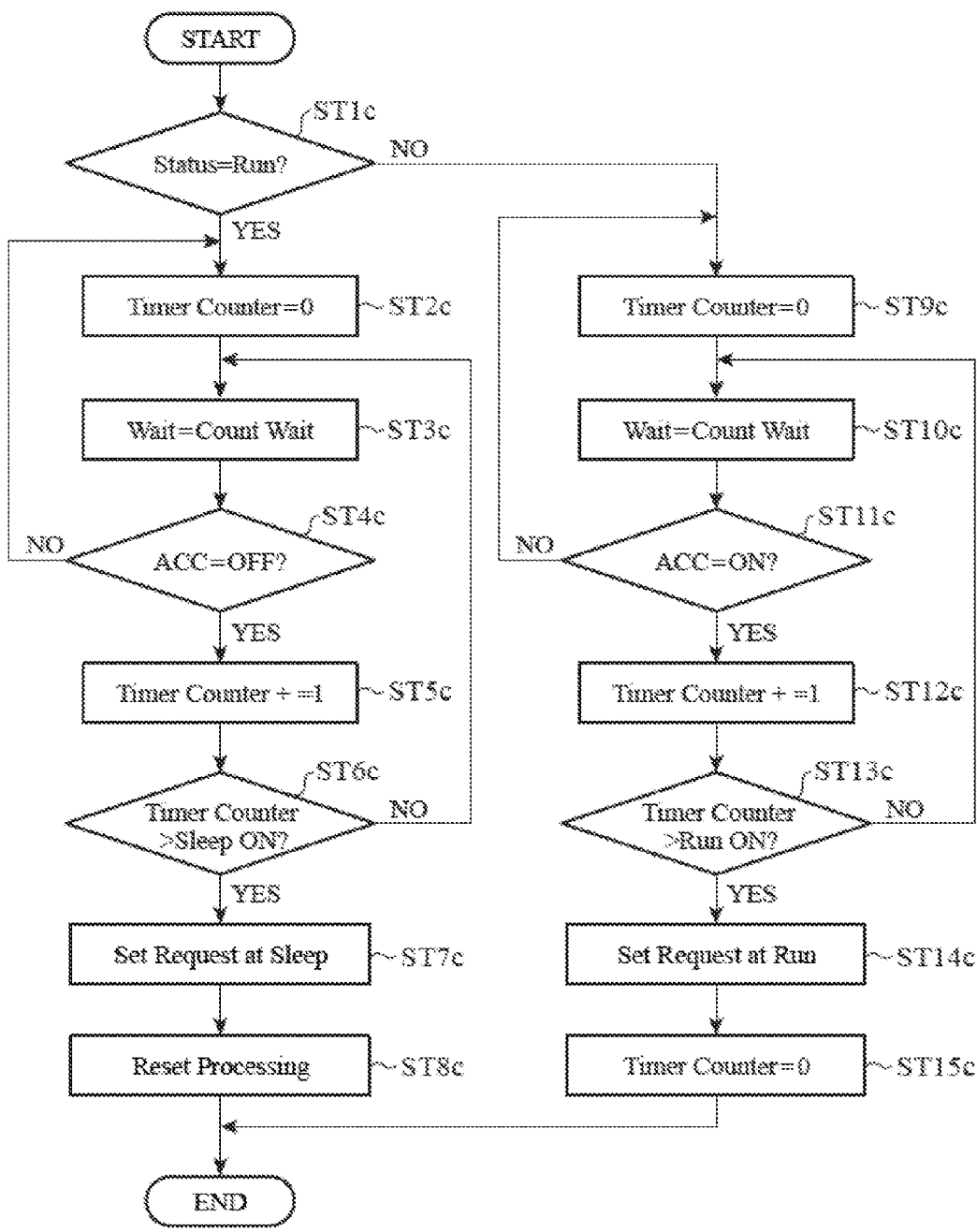
FIG. 10 is a flowchart showing details of the Sleep/Run processing of the embodiment 2.

FIG. 10 is a flowchart showing the details of the Sleep/Run processing of the embodiment 2, and shows the processing at step ST4b of FIG. 9.

First, when the ACC check control circuit 4A starts the Sleep/Run processing, it decides on whether the Status signal received from the control block of the smartphone board 5 indicates the Run mode or not (step ST1c).

If the Status signal is in the Run mode (YES at step ST1c), the ACC check control circuit 4A initializes the count value of the timer (TimerCounter) to "0" (step ST2c).

After that, the ACC check control circuit 4A proceeds to the waiting mode until the timer counts the monitoring time interval (CountWait=10 milliseconds) (step ST3c).

If the timer counts the monitoring time interval (CountWait=10 milliseconds), the ACC check control circuit 4A decides on whether the ACC signal is in the OFF state or not (step ST4c). Unless the ACC signal is in the OFF state (NO at step ST4c), it returns to the processing at step ST2c.

On the other hand, if the ACC signal is in the OFF state (YES at step ST4c), the ACC check control circuit 4A increments the count value of the timer (TimerCounter) by one (step ST5c).

Next, the ACC check control circuit 4A decides on whether the count value of the timer (TimerCounter) exceeds the prescribed count number set at step ST1b of FIG. 9 (30 counts: Sleep ON) (TimerCounter>Sleep ON) or not (step ST6c). If the count value of the timer (TimerCounter) is not greater than the prescribed count number (Sleep ON) (NO at step ST6c), the ACC check control circuit 4A returns to step ST3c to enter the waiting mode, and repeats the foregoing processing.

If the count value of the timer (TimerCounter) exceeds the prescribed count number (Sleep ON) (YES at step ST6c), the ACC check control circuit 4A sends the Request signal for requesting the Sleep mode to the control block of the smartphone board 5 (step ST7c).

The control block of the smartphone board 5 proceeds to the Sleep mode in accordance with the Request signal from the ACC check control circuit 4A, and responds to the ACC check control circuit 4A by sending the Status signal indicating that.

After that, the ACC check control circuit 4A proceeds to the Reset processing (step ST8c).

In addition, unless the Status signal shows the Run mode (NO at step ST1c), the ACC check control circuit 4A initialize the count value of the timer (TimerCounter) to "0" (step ST9c).

The ACC check control circuit 4A proceeds to the waiting mode and remains there until the timer counts the monitoring time interval (CountWait=10 milliseconds) (step ST10c).

If the timer counts the monitoring time interval (CountWait=10 milliseconds), the ACC check control circuit 4A decides on whether the ACC signal is in the ON state or not (step ST11c). Unless the ACC signal is in the ON state (NO at step ST11c), it returns to the processing at step ST9c.

On the other hand, if the ACC signal is in the ON state (YES at step ST11c), the ACC check control circuit 4A increments the count value of the timer (TimerCounter) by one (step ST12c).

Next, the ACC check control circuit 4A decides on whether the count value of the timer (TimerCounter) exceeds the prescribed count number (15 counts: Run ON) set at step ST1b of FIG. 9 or not (TimerCounter>Run ON) (step ST13c). If the count value of the timer (TimerCounter) is not greater than the prescribed count number (Run ON) (NO at step ST13c), the ACC check control circuit 4A returns to step ST10c to enter the waiting mode, and the repeats foregoing processing.

If the count value of the timer (TimerCounter) exceeds the prescribed count number (Run ON) (YES at step ST13c), the ACC check control circuit 4A sends the Request signal for requesting the Run mode to the control block of the smartphone board 5 (step ST14c). The control block of the smartphone board 5 proceeds to the Run mode in accordance with the Request signal from the ACC check control circuit 4A, and responds to the ACC check control circuit 4A by sending the Status signal indicating that.

After that, the ACC check control circuit 4A sets the count value of the timer (TimerCounter) at "0" (step ST15c), and terminates the Sleep/Run processing.

Figure 11:
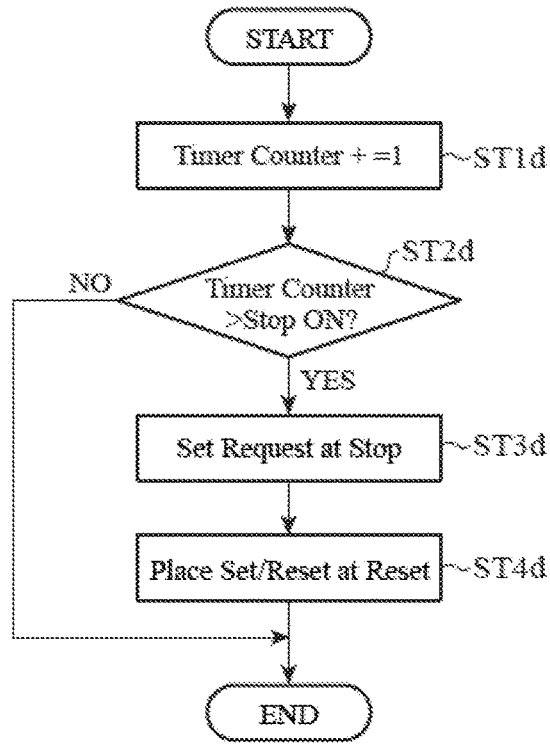
FIG. 11 is a flowchart showing details of the Reset processing of the embodiment 2.

FIG. 11 is a flowchart showing the details of the Reset processing of the embodiment 2, which shows the processing at step ST8c of FIG. 10.

First, the ACC check control circuit 4A sets the Request signal at Run, and then increments the count value of the timer (TimerCounter) by one (step ST1d).

Next, the ACC check control circuit 4A decides on whether the count value of the timer (TimerCounter) exceeds the prescribed count number (3000 counts: Stop ON) set at step ST1b of FIG. 9 (TimerCounter>Stop ON) or not (step ST2d). If the count value of the timer (TimerCounter) is not greater than the prescribed count number (Stop ON) (NO at step ST2d), the ACC check control circuit 4A terminates the Reset processing.

If the count value of the timer (TimerCounter) exceeds the prescribed count number (Stop ON) (YES at step ST2d), the ACC check control circuit 4A sends the Request signal for requesting the Stop mode to the control block of the smartphone board 5 (step ST3d). The control block of the smartphone board 5 proceeds to the Stop mode in accordance with the Request signal of the ACC check control circuit 4A.

After that, the ACC check control circuit 4A sets the Set/Reset signal at Reset, and instructs the primary power source circuit block 2 and secondary power source circuit block 3 to terminate the operation (step ST4d).

As described above, according to the present embodiment 2, the ACC check control circuit 4A makes a request to the control block for one of the Run mode which is the normal operational mode, the Sleep mode which is the operational mode with lower power consumption than the Run mode and the Stop mode which is the operation stopped state in accordance with the duration of the ON state or OFF state of the ACC signal of the vehicle, and the control block operates in the operational mode requested by the ACC check control circuit 4A.

In this way, the present embodiment 2 can operate the control block of the smartphone board 5 in the Sleep mode when the ACC signal continues the OFF state for the prescribed time period, thereby being able to meet the energy-saving operation request of the short-time period B1 during the operation of the vehicle.

In addition, it can achieve quick return to the operation by setting the operation of the control block to the Run mode if the ACC signal changes from the OFF state to the ON state after continuing the prescribed time period A1.

Embodiment 3

Figure 12:
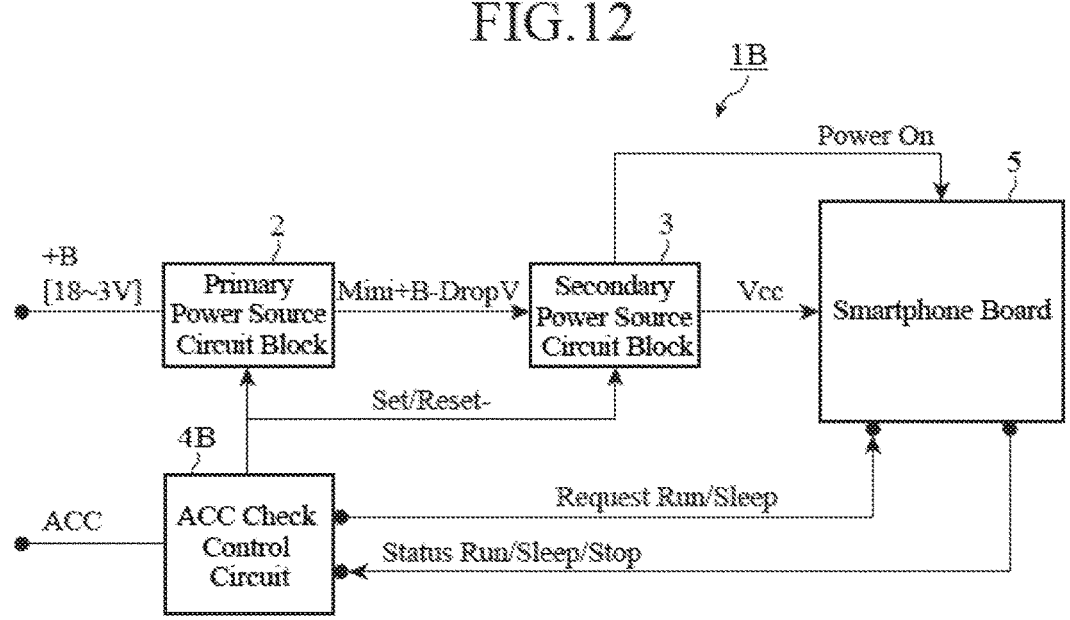
FIG. 12 is a block diagram showing a configuration of a power source system device of an embodiment 3 in accordance with the present invention.

FIG. 12 is a block diagram showing a configuration of a power source system device of an embodiment 3 in accordance with the present invention, which shows a case of supplying the power source voltage Vcc to the control block incorporated into a smartphone. The power source system device 1B as shown in FIG. 12, which is a device that supplies the power source voltage Vcc to the control block that uses a general-purpose OS from the battery voltage of an onboard battery (not shown in FIG. 12), comprises the primary power source circuit block 2, the secondary power source circuit block 3 and an ACC check control circuit 4B. The ACC check control circuit 4B not only operates in the same manner as the ACC check control circuit 4 of FIG. 2, but also makes a request (Request) to the control block of the smartphone board 5 for a Run or Sleep as a prescribed operational mode (Status). Although the control block of the smartphone board 5 proceeds to the operational mode corresponding to the Request signal from the ACC check control circuit 4B, it proceeds to the Stop mode when the Sleep mode continues for a prescribed time period. Incidentally, in FIG. 12, the same components as those of FIG. 2 are designated by the same reference symbols, and their description will be omitted.

Next, the operation will be described.

Figure 13:
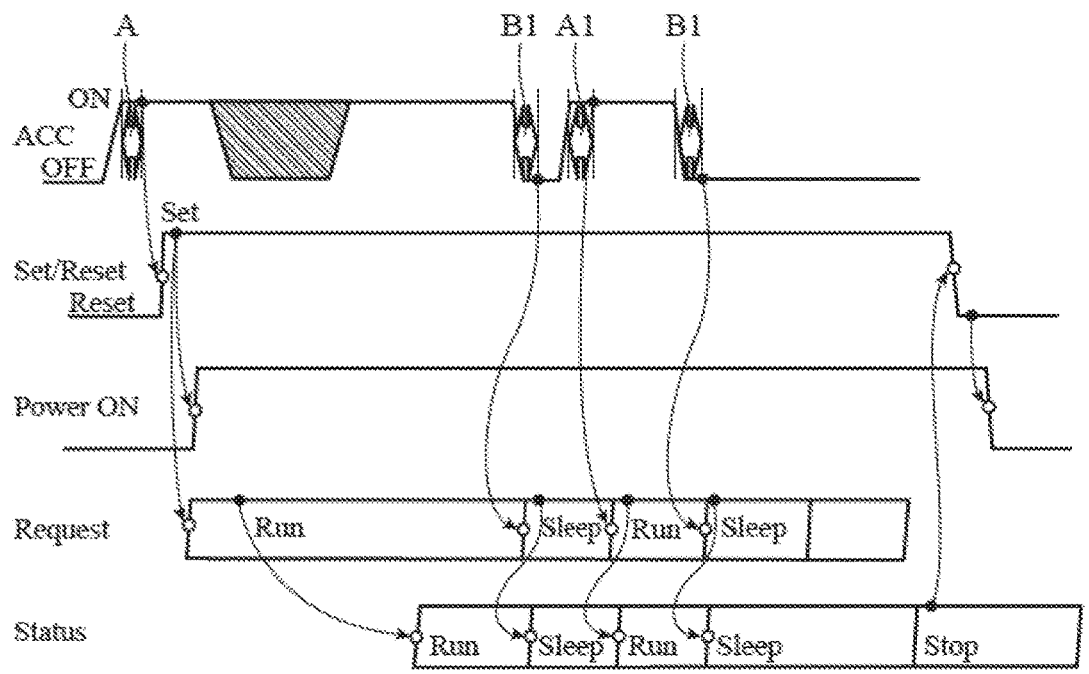
FIG. 13 is a timing chart of an ACC signal, a Set/Reset signal, a start signal PowerON, a Request signal and a Status signal used in the power source system device of the embodiment 3.

FIG. 13 is a timing chart of the ACC signal, Set/Reset signal, start signal PowerON, Request signal and Status signal used in the power source system device of the embodiment 3.

The ACC check control circuit 4B is periodically monitoring the value of the ACC signal, and counts the prescribed time period A from the point of time the ACC signal is turned on with a timer not shown.

When the ACC signal continues the ON state for the prescribed time period A, the ACC check control circuit 4B sets the Set/Reset signal at Set as shown in FIG. 13, and instructs the primary power source circuit block 2 and secondary power source circuit block 3 to start their operation.

The prescribed time period A is set in accordance with the specification as to the start time period in the system.

Receiving the Set signal from the ACC check control circuit 4B, the primary power source circuit block 2 generates the voltage (Mini+B−DropV) by reducing the maximally dropped battery voltage (Mini+B) occurring in the onboard battery at the start of the engine by the prescribed voltage DropV, and supplies it to the secondary power source circuit block 3.

Receiving the Set signal from the ACC check control circuit 4B and the voltage (Mini+B−DropV) from the primary power source circuit block 2, the secondary power source circuit block 3 generates the power source voltage Vcc by boosting the voltage (Mini+B−DropV).

Next, the secondary power source circuit block 3 supplies the power source voltage Vcc it generates to the control block of the smartphone board 5, followed by supplying the start signal PowerON to the control block to start the control block as shown in FIG. 13.

In addition, when the ACC check control circuit 4B sets the Set/Reset signal at Set, it sends the Request signal that makes a request to the control block of the smartphone board 5 for the Run mode as shown in FIG. 13.

Receiving the Request signal from the ACC check control circuit 4B, the control block of the smartphone board 5 shifts to the operational mode requested by the Request signal, and sends a response about that to the ACC check control circuit 4B as the Status signal. Thus, when the control block enters the Run mode, it sends the Status signal indicating that it enters the Run mode to the ACC check control circuit 4B.

After that, the ACC check control circuit 4B counts the prescribed time period B1 from the point of time the ACC signal becomes OFF state. If the OFF state of the ACC signal continues for the prescribed time period B1, the ACC check control circuit 4B sends the Request signal for requesting the Sleep mode to the control block of the smartphone board 5 as shown in FIG. 13.

The control block of the smartphone board 5 proceeds to the Sleep mode which is the operational mode indicated by the Request signal received from the ACC check control circuit 4B, and sends a response indicating that to the ACC check control circuit 4B as the Status signal.

Incidentally, the prescribed time period B1 is set in accordance with the specification about the proceeding time period from the normal mode to the power saving mode in the system.

Next, if the ACC signal changes its state from the OFF state to the ON state, the ACC check control circuit 4B counts the prescribed time period (time period indicated by the double-pointed arrow A1 in FIG. 13) from the point of time the ACC signal becomes ON state.

If the ON state of the ACC signal continues for the prescribed time period A1, the ACC check control circuit 4B sends the Request signal for requesting the Run mode to the control block of the smartphone board 5 as shown in FIG. 13.

Receiving the Request signal from the ACC check control circuit 4B, the control block of the smartphone board 5 proceeds to the Run mode requested by the Request signal, and responds to the ACC check control circuit 4B by sending the Status signal indicating that.

If the control block changes its state from the Sleep mode to the Run mode because of the supply of the operation clock signal, it sends the Status signal indicating that it enters the Run mode to the ACC check control circuit 4B.

Incidentally, the prescribed time period A1 is set in accordance with the specification about the proceeding time period from the power saving mode to the normal mode in the system.

After that, the ACC check control circuit 4B counts the prescribed time period B1 from the point of time the ACC signal becomes OFF state. When the OFF state of the ACC signal continues for the prescribed time period B1, the ACC check control circuit 4B sends the Request signal for requesting the Sleep mode to the control block of the smartphone board 5 as shown in FIG. 13. The control block of the smartphone board 5 proceeds to the Sleep mode requested by the Request signal received by the ACC check control circuit 4B.

The control block of the smartphone board 5 counts a prescribed time period C from the point of time it enters the Sleep mode. When the Sleep mode continues for the prescribed time period C, the control block of the smartphone board 5 proceeds to a Stop mode as shown in FIG. 13, and sends a response indicating that to the ACC check control circuit 4B as the Status signal.

Incidentally, the prescribed time period C is set at a time period longer than the saving time of the user memory in which a user stores data using an application on the general-purpose OS, and longer than the saving time of the system memory which the general-purpose OS uses in accordance with the state of the system.

Next, concrete processing for executing the operation of the timing chart of FIG. 13 will be described.

Since the basic operation of the ACC check control circuit 4B is the same as that of FIG. 9 of the foregoing embodiment 2, its description will be omitted.

In addition, since the Set processing by the ACC check control circuit 4B is the same as that of FIG. 5 in the foregoing embodiment 1, its description will be omitted.

Figure 14:
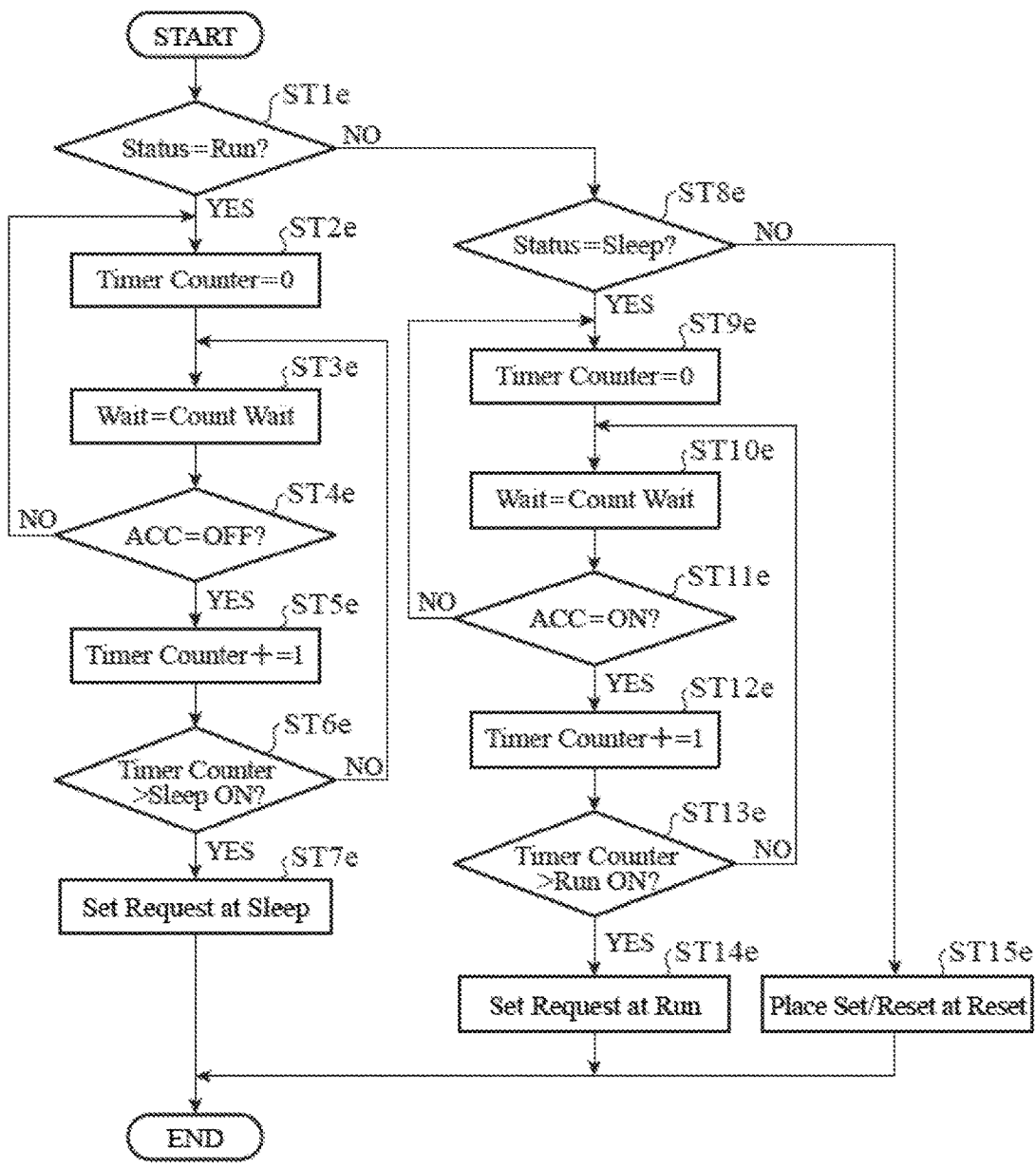
FIG. 14 is a flowchart showing details of the Sleep/Run processing of the embodiment 3.

FIG. 14 is a flowchart showing the details of the Sleep/Run processing of the embodiment 3, which corresponds to the processing of step ST4$b$ of FIG. 9 of the foregoing embodiment 2.

First, when the ACC check control circuit 4B starts the Sleep/Run processing, it decides on whether the Status signal received from the control block of the smartphone board 5 indicates the Run mode or not (step ST1$e$).

If the Status signal indicates the Run mode (YES at step ST1$e$), the ACC check control circuit 4B initializes the count value of the timer (TimerCounter) to "0" (step ST2$e$).

After that, the ACC check control circuit 4B proceeds to the waiting mode and remains there until the timer counts the monitoring time interval (CountWait=10 milliseconds) (step ST3$e$).

If the timer counts the monitoring time interval (CountWait=10 milliseconds), the ACC check control circuit 4B decides on whether the ACC signal is in the OFF state or not (step ST4$e$). Unless the ACC signal is in the OFF state (NO at step ST4$e$), it returns to the processing at step ST2$e$.

On the other hand, if the ACC signal is in the OFF state (YES at step ST4$e$), the ACC check control circuit 4B increments the count value of the timer (TimerCounter) by one (step ST5$e$).

Next, the ACC check control circuit 4B decides on whether the count value of the timer (TimerCounter) exceeds the prescribed count number (30 counts: Sleep ON) (TimerCounter>Sleep ON) or not (step ST6$e$).

If the count value of the timer (TimerCounter) is not greater than the prescribed count number (Sleep ON) (NO at step ST6$e$), the ACC check control circuit 4B returns to step ST3$e$ to enter the waiting mode, and repeats the foregoing processing.

If the count value of the timer (TimerCounter) exceeds the prescribed count number (Sleep ON) (YES at step ST6$e$), the ACC check control circuit 4B sends the Request signal for requesting the Sleep mode to the control block of the smartphone board 5 (step ST7$e$), and terminates the Sleep/Run processing.

The control block of the smartphone board 5 proceeds to the Sleep mode in accordance with the Request signal of the ACC check control circuit 4B, and sends the Status signal indicating that to the ACC check control circuit 4B.

Unless the Status signal shows the Run mode (NO at step ST1$e$), the ACC check control circuit 4B decides on whether the Status signal received from the control block of the smartphone board 5 shows the Sleep mode or not (step ST8$e$).

If the Status signal indicates the Sleep mode (YES at step ST8$e$), the ACC check control circuit 4B initializes the count value of the timer (TimerCounter) to "0" (step ST9$e$).

The ACC check control circuit 4B proceeds to the waiting mode and remains there until the timer counts the monitoring time interval (CountWait=10 milliseconds) (step ST10$e$).

If the timer counts the monitoring time interval (CountWait=10 milliseconds), the ACC check control circuit 4B decides on whether the ACC signal is in the ON state or not (step ST11$e$). Unless the ACC signal is in the ON state (NO at step ST11$e$), it returns to the processing at step ST9$e$.

On the other hand, if the ACC signal is in the ON state (YES at step ST11$e$), the ACC check control circuit 4B increments the count value of the timer (TimerCounter) by one (step ST12$e$).

Next, the ACC check control circuit 4B decides on whether the count value of the timer (TimerCounter) exceeds the prescribed count number (15 counts: Run ON) (TimerCounter>Run ON) or not (step ST13$e$).

If the count value of the timer (TimerCounter) is not greater than the prescribed count number (Run ON) (NO at step ST13$e$), the ACC check control circuit 4B returns to step ST10$e$ to enter waiting mode, and repeats the foregoing processing.

If the count value of the timer (TimerCounter) exceeds the prescribed count number (Run ON) (YES at step ST13$e$), the ACC check control circuit 4B sends the Request signal for requesting the Run mode to the control block of the smartphone board 5 (step ST14$e$), and terminates the Sleep/Run processing.

The control block of the smartphone board 5 proceeds to the Run mode in accordance with the Request signal of the ACC check control circuit 4B, and sends the Status signal indicating that to the ACC check control circuit 4B.

In addition, unless the Status signal indicates the Sleep mode (NO at ST8e), the ACC check control circuit 4B places the Set/Reset signal at Reset, and instructs the primary power source circuit block 2 and secondary power source circuit block 3 to terminate their operation (step ST15e).

Figure 15:
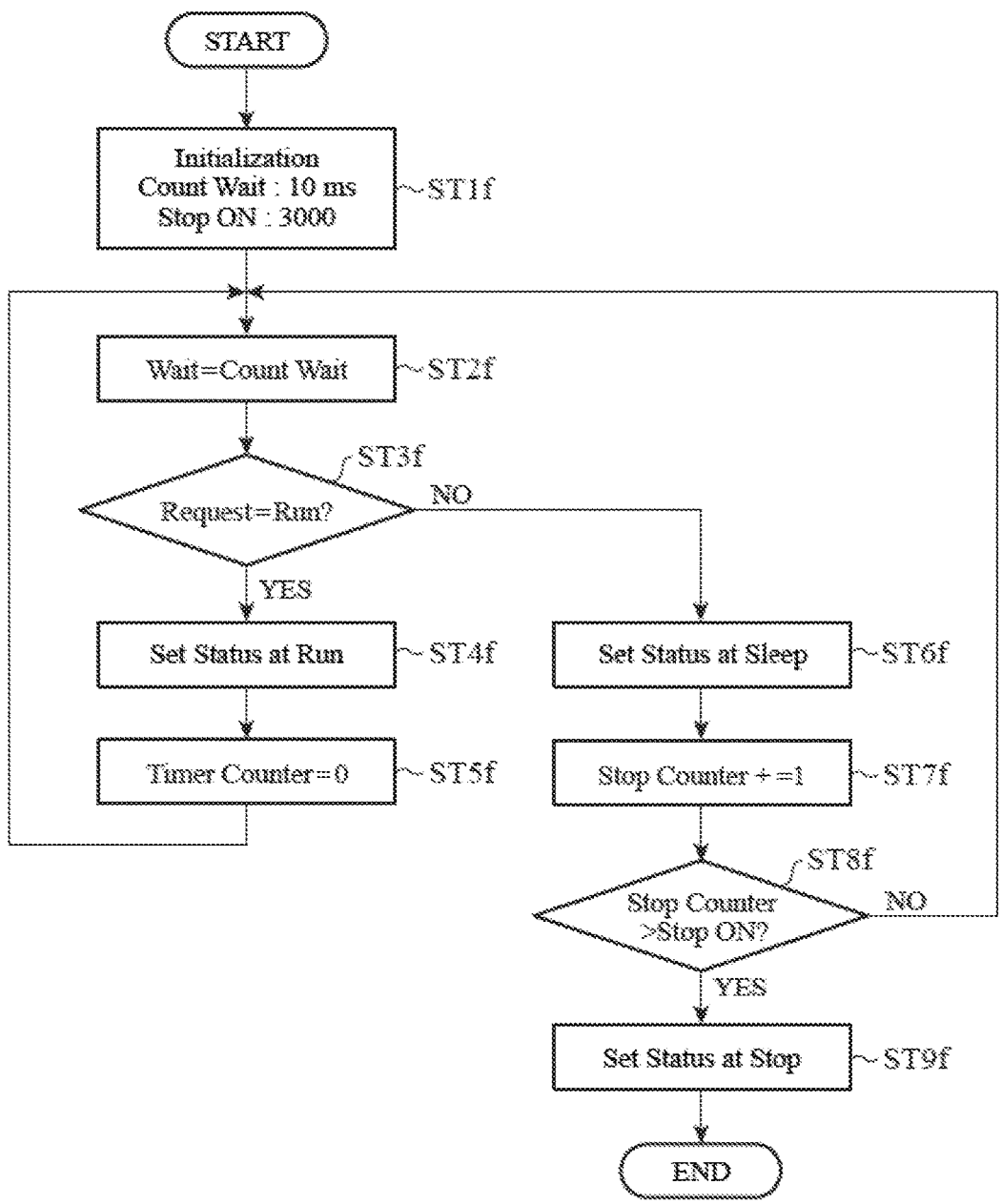
FIG. 15 is a flowchart showing details of the Stop processing of the embodiment 3.

FIG. 15 is a flowchart showing the details of the Stop processing of the embodiment 3. The Stop processing is the processing executed when the control block of the smartphone board 5 enters the Sleep mode.

First, the control block of the smartphone board 5 initializes the count value of the timer (StopCounter) that counts the time period for shifting from the Sleep mode to the Stop mode, and sets the count interval time (CountWait) and the count number (Stop ON) indicating the prescribed time period C for shifting from the Sleep mode to the Stop mode (step ST1f).

For example, it sets the count interval time (CountWait) at 10 milliseconds, and the count number (Stop ON) for proceeding to the Stop mode at 3000.

Next, the control block of the smartphone board 5 proceeds to the waiting mode and remains there until the count interval time (CountWait=10 milliseconds) has elapsed (step ST2f).

If the timer counts the count interval time (CountWait=10 milliseconds), the control block of the smartphone board 5 decides on whether the Request signal from the ACC check control circuit 4B indicates the Run mode or not (step ST3f).

If the Request signal indicates the Run mode (YES at step ST3f), the control block of the smartphone board 5 sets its operational mode at the Run mode (step ST4f). After that, the control block of the smartphone board 5 initializes the count value of the timer (StopCounter) to "0" (step ST5f), and returns to the processing at step ST2f.

On the other hand, unless the Request signal indicates the Run mode (NO at step ST3f), the control block of the smartphone board 5 sets its operational mode at the Sleep mode (step ST6f).

After that, the control block of the smartphone board 5 increments the count value of the timer (StopCounter) by one (step ST7f).

Next, the control block of the smartphone board 5 decides on whether the count value of the timer (StopCounter) exceeds the prescribed count number (3000 counts: Stop ON) set at step ST1f (StopCounter>Stop ON) or not (step ST8f). If the count value of the timer (StopCounter) is not greater than the prescribed count number (Stop ON) (NO at step ST8f), the control block of the smartphone board 5 returns to step ST2f to enter the waiting mode, and repeats the foregoing processing.

If the count value of the timer (StopCounter) exceeds the prescribed count number (Stop ON) (YES at step ST8f), the control block of the smartphone board 5 proceeds to the Stop mode (step ST9f), sends the Status signal indicating that back to the ACC check control circuit 4B, and terminates the Stop processing.

As described above, according to the present embodiment 3, the ACC check control circuit 4B makes a request to the control block for one of the Run mode which is the normal operational mode and the Sleep mode which is the operational mode with the power consumption lower than that in the Run mode in accordance with the duration of the ON state or OFF state of the ACC signal of a vehicle, and the control block works in the Operational mode requested by the ACC check control circuit 4B, and stops its operation when the Sleep mode continues for the prescribed time period C.

Thus, since the control block of the smartphone board 5 proceeds to a termination of its operation (Stop mode) in accordance with the duration of the Sleep mode, it can reduce the instability at the termination of the operation.

Incidentally, it is to be understood that a free combination of the individual embodiments, variations of any components of the individual embodiments or removal of any components of the individual embodiments are possible within the scope of the present invention.

INDUSTRIAL APPLICABILITY

A power source system device in accordance with the present invention can use a general-purpose OS in the power source environment of the onboard battery of a vehicle. Accordingly, it is suitable for an application to the power source system device of a vehicle comprising an electronic control unit capable of connecting various external information terminals.

DESCRIPTION OF REFERENCE SYMBOLS 1, 1A, 1B power source system device; 2 primary power source circuit block; 3 secondary power source circuit block; 4, 4A, 4B ACC check control circuit; 5 smartphone board.

What is claimed is:
1. A power source system device comprising:
    a primary power source circuit block that generates a voltage further dropped from a lowest voltage of an onboard battery that supplies power to electric and electronic parts of a vehicle, the lowest voltage occurring at a start of the engine of the vehicle;
    a secondary power source circuit block that generates a power source voltage by boosting the voltage generated by the primary power source circuit block, supplies the power source voltage to an integrated circuit including a control block that executes a general-purpose operation system, and starts the integrated circuit; and
    a control circuit that controls a start and stop of an operation of the primary power source circuit block and the secondary power source circuit block.

2. The power source system device according to claim 1, wherein
    the control circuit controls the primary power source circuit block and the secondary power source circuit block in a manner as to start their operation if an ON state of an accessory signal of the vehicle continues for a prescribed time period, and controls the primary power source circuit block and the secondary power source circuit block in a manner as to terminate their operation if an OFF state of the accessory signal of the vehicle continues for a prescribed time period.

3. The power source system device according to claim 1, wherein
    the control circuit makes a request to the integrated circuit for one of a Run mode which is a normal operational mode, a Sleep mode which is an operational mode with power consumption lower than the Run mode, and a Stop mode which is an operation stopped state in accordance with duration of an ON state or OFF state of the accessory signal of the vehicle; and
    the integrated circuit operates in the operational mode requested by the control circuit.

4. The power source system device according to claim 1, wherein
the control circuit makes a request to the integrated circuit for one of a Run mode which is a normal operational mode, and a Sleep mode which is an operational mode with power consumption lower than the Run mode in accordance with duration of an ON state or OFF state of the accessory signal of the vehicle; and
the integrated circuit operates in the operational mode requested by the control circuit, and stops its operation if the Sleep mode continues for a prescribed time period.

* * * * *